US012670397B2

(12) United States Patent
Seki et al.

(10) Patent No.: US 12,670,397 B2
(45) Date of Patent: Jun. 30, 2026

(54) MACHINE LEARNING METHOD AND PRUNING METHOD

(71) Applicant: DENSO TEN Limited, Kobe (JP)

(72) Inventors: Ryusuke Seki, Kobe (JP); Yasutaka Okada, Kobe (JP); Yuki Katayama, Kobe (JP)

(73) Assignee: DENSO TEN Limited, Kobe (JP)

( * ) Notice: Subject to any disclaimer, the term of this patent is extended or adjusted under 35 U.S.C. 154(b) by 837 days.

(21) Appl. No.: 17/993,623

(22) Filed: Nov. 23, 2022

(65) Prior Publication Data

US 2023/0162037 A1 May 25, 2023

(30) Foreign Application Priority Data

Nov. 24, 2021 (JP) ................................. 2021-189795
Jul. 12, 2022 (JP) ................................. 2022-111869

(51) Int. Cl.
*G06N 3/082* (2023.01)
*G06N 3/045* (2023.01)
*G06N 3/048* (2023.01)
*G06N 3/084* (2023.01)

(52) U.S. Cl.
CPC .................................... *G06N 3/082* (2013.01)

(58) Field of Classification Search
CPC .................................................... G06N 3/082
See application file for complete search history.

(56) References Cited

U.S. PATENT DOCUMENTS

| | | | | |
|---|---|---|---|---|
| 2019/0362235 A1* | 11/2019 | Xu | ............................ | G06N 3/04 |
| 2020/0410348 A1 | 12/2020 | Ida | | |
| 2021/0201526 A1 | 7/2021 | Moloney et al. | | |
| 2021/0256385 A1* | 8/2021 | Wang | ..................... | G06N 3/082 |
| 2024/0127068 A1 | 4/2024 | Moloney et al. | | |
| 2025/0225397 A1 | 7/2025 | Xu et al. | | |

FOREIGN PATENT DOCUMENTS

| | | | | |
|---|---|---|---|---|
| CN | 113255912 A | 8/2021 | | |
| CN | 112052951 B | * 7/2024 | ............. | G06N 3/045 |
| JP | 2019-185275 A | 10/2019 | | |
| JP | 2021-526253 A | 9/2021 | | |

OTHER PUBLICATIONS

Aug. 5, 2025 Office Action issued in Japanese Patent Application No. 2021-189795.
Mar. 24, 2026 Office Action issued in Japanese Patent Application No. 2022-111869.

* cited by examiner

*Primary Examiner* — Eric Nilsson
(74) *Attorney, Agent, or Firm* — Oliff PLC

(57) ABSTRACT

In a method of creating a learning model using a controller configured to perform pruning on a neural network, the pruning includes a first pruning process in which a pruning process is performed in units of channels of convolutional layers and a second pruning process in which a pruning process is performed in units of weight parameters.

9 Claims, 12 Drawing Sheets

33aM,33      33aL,33      33bF,33

33aM,33      33aL,33      33bF,33

CHO1     40     CHI1

MACHINE LEARNING METHOD AND PRUNING METHOD

This application is based on Japanese Patent Application No. 2021-189795 filed on Nov. 24, 2021 and Japanese Patent Application No. 2022-111869 filed on Jul. 12, 2022, the contents of both of which are hereby incorporated by reference.

BACKGROUND OF THE INVENTION

1. Field of the Invention

The present invention relates to a technology of performing pruning on a neural network.

2. Description of Related Art

Pruning is known as a method that permits a neural network trained through deep learning to be run on an edge device with limited computing resources. In pruning, redundant parameters contained in a neural network are deleted. Through pruning, a neural network is compressed, and this helps improve computation efficiency in the neural network. JP-A-2019-185275 discloses a technology of deleting layers in a multilayer neural network. A learning apparatus according to JP-A-2019-185275 operates as follows. For each of the layers in a multilayer neural network, the apparatus calculates a contribution level, i.e., the degree of contribution to the result of inference by the multilayer neural network. Then based on the contribution factors of those layers, the apparatus selects the layers to be deleted. The apparatus then deletes from the multilayer neural network the selected layers to be deleted, and then trains the multilayer neural network from which the layers to be deleted have been deleted.

SUMMARY OF THE INVENTION

A configuration that permits layer-by-layer deletion of the layers constituting a neural network helps improve the computation efficiency of the neural network having undergone deletion but may lead to lower processing accuracy of the neural network. On the other hand, if pruning fails to delete redundant parameters sufficiently, the neural network having undergone pruning may not have sufficiently improved computation efficiency.

Under the background discussed above, an object of the present invention is to provide a technology that gives improved computation efficiency in a neural network having undergone pruning while suppressing a drop in processing accuracy.

According to one illustrative embodiment of the present invention, in a method of creating a learning model using a controller configured to perform pruning on a neural network, the pruning includes: a first pruning process in which a pruning process is performed in units of channels of convolutional layers; and a second pruning process in which a pruning process is performed in units of weight parameters.

According to another illustrative embodiment of the present invention, in a method of machine learning using a controller configured to perform pruning on a neural network, the controller is configured to classify convolutional layers of which outputs have identical linkage states of residual connections into a group and calculate an importance level, and to decide according to the calculated importance level whether to perform the pruning in units of channels in the convolutional layers classified into the group.

DETAILED DESCRIPTION OF PREFERRED EMBODIMENTS

Illustrative embodiment of the present invention will be described below with reference to the accompanying drawings.

1. First Embodiment

<1-1. Machine Learning System>

Figure 1:
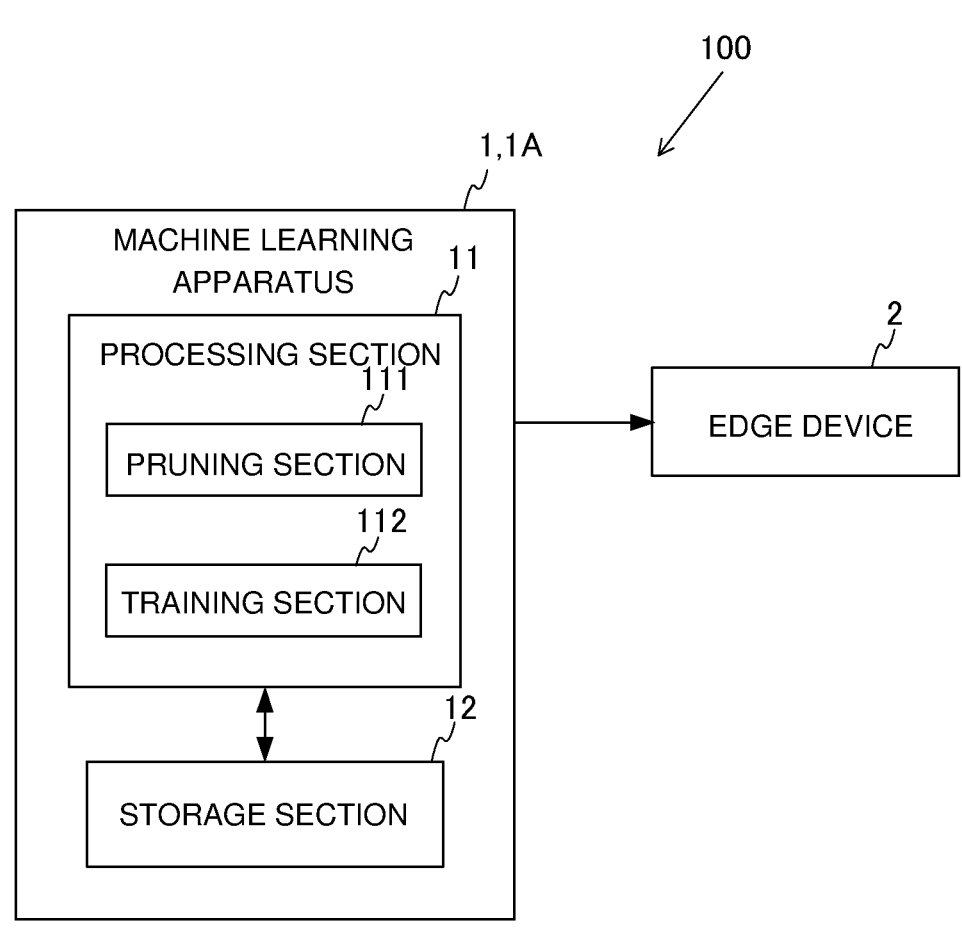
FIG. 1 is a block diagram showing an outline of the configuration of a machine learning system.

FIG. 1 is a block diagram showing an outline of the configuration of a machine learning system 100 according to an embodiment of the present invention. As shown in FIG. 1, the machine learning system 100 includes a machine learning apparatus 1 and an edge device 2.

The machine learning apparatus 1 performs processes related to the creation of a trained neural network. The processes performed by the machine learning apparatus 1 at least include a process of performing pruning on a trained neural network. In this embodiment, the processes performed by the machine learning apparatus 1 include, in addition to pruning, a re-training process after pruning.

The machine learning apparatus 1 may solely perform pruning. In that case, the machine learning apparatus 1 may be a pruning apparatus. For another example, the processes performed by the machine learning apparatus 1 may include a process, performed prior to pruning, of training a neural network (i.e., a prior training process).

In this embodiment, the machine learning apparatus 1 is connected to the edge device 2 across a communication network such as the Internet. The machine learning apparatus 1 is what is generally called a server apparatus, and delivers to the edge device 2 a neural network having undergone pruning and subsequent re-training. A server apparatus here may be a physical server or a cloud server. The edge device 2 may be, for example, a smartphone, a personal computer, a vehicle-mounted device, an IoT (Internet-of-things) appliance, or the like.

Incidentally, a neural network having undergone pruning and subsequent re-training on the machine learning apparatus 1 may be, for example, recorded to a recording medium such as an optical or magnetic recording medium and may be, via the recording medium, provided for an external device (such as a vehicle-mounted device). A neural network having undergone pruning and subsequent re-training on the machine learning apparatus 1 may be, on a wired basis, provided for an external device (such as a vehicle-mounted device).

<1-2. Machine Learning Apparatus>

(1-2-1. Outline of the Apparatus)

As shown in FIG. 1, the machine learning apparatus 1 includes a processing section 11 and a storage section 12.

The processing section 11 is composed of, for example, one or a plurality of processors. The processors may be configured to include, for example, a CPU (central processing unit) or a GPU (graphics processing unit). Or the processors may be configured to include, for example, a CPU and a GPU. The processing section 11 can be a controller configured with arithmetic circuits.

The storage section 12 stores or holds computer-readable programs and data on a non-temporary basis. The storage section 12 includes a non-volatile storage medium. The non-volatile storage included in the storage section 12 may comprise, for example, at least one of a semiconductor memory, a magnetic medium, an optical medium, and the like. The storage section 12 also includes a volatile recording medium that constitutes a RAM (random-access memory).

As shown in FIG. 1, the processing section 11 includes, as functional blocks, a pruning section 111 and a training section 112. The pruning section 111 and the training section 112 provided in the processing section 11 are implemented, for example, by a processor performing computational processes according to programs stored in the storage section 12. The scope of this embodiment covers a computer program for implementing the machine learning apparatus 1 on a computer. The scope of this embodiment also covers a computer-readable non-volatile recording medium with such a program recorded on it.

The above-mentioned sections 111 and 112 may be implemented by a processor executing a program as mentioned above, that is, in the form of software, or may be implemented with any other scheme. The above-mentioned sections 111 and 112 may be implemented, for example, with an ASIC (application-specific integrated circuit), an FPGA (field-programmable gate array), or the like. That is, the above-mentioned sections 111 and 112 may be implemented in the form of hardware by use of a dedicated IC or the like. The above-mentioned sections 111 and 112 may be implemented as a combination of software and hardware. The above-mentioned sections 111 and 112 are conceptual components. A function executed by one component may be distributed among a plurality of components; a function achieved by a plurality of components may be integrated in a single component.

The pruning section 111 performs pruning on a neural network. That is, the machine learning apparatus 1 includes a processing section 11 that performs pruning on a neural network. Specifically, the neural network on which pruning is to be performed is a trained neural network that has previously undergone prior training. The prior training may be performed on the machine learning apparatus 1 or on any other apparatus. The trained neural network on which pruning is to be performed differs from a trained neural network that the machine learning apparatus 1 delivers to the edge device 2.

[1-2-1-1. Outline of Pruning]

Figure 2:
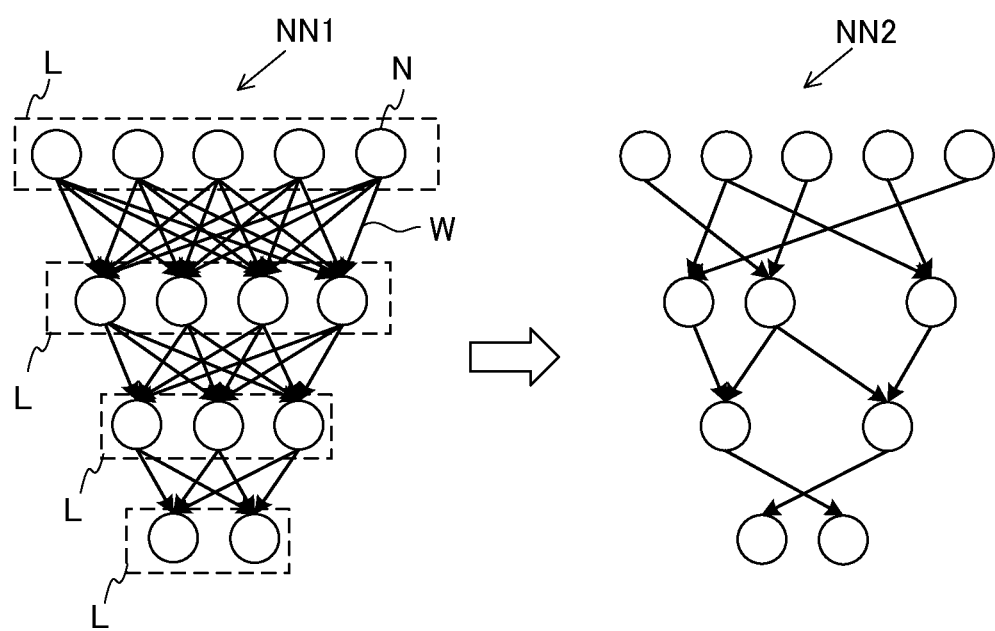
FIG. 2 is a schematic diagram showing an outline of pruning.

Now, a general description will be given of pruning. FIG. 2 is a schematic diagram showing an outline of pruning. The neural network NN1 shown at left in FIG. 2 is one before pruning. The neural network NN2 shown at right in FIG. 2 is a neural network resulting from performing pruning on the neural network NN1.

As shown in FIG. 2, the neural networks NN1 and NN2 have a plurality of layers L each including a plurality of neurons N. In the example shown in FIG. 2, the neural networks NN1 and NN2 each have four layers L. The neurons N are what is generally called nodes. Between layers L, weights W are assigned that indicate the strength of association between neurons N. As shown in FIG. 2, the pruned neural network NN2 has less neurons N and less weights W than the unpruned neural network NN1. That is, performing pruning results in removing at least either some weights W or some neurons N. The numbers of neurons N and weights W included in the pruned neural network NN2 are smaller than those in the unpruned neural network NN1. In other words, the pruned neural network NN2 has a reduced scale (is compressed) compared with before pruning. Since the pruned neural network NN2 is compressed, using it helps reduce the amount of computation, the amount of memory use, and the amount of memory access, and it is thus possible to improve computation efficiency. Note that pruning in the embodiment is pruning on a neural network including convolutional layers, and the specific processing it requires is not so simple as what has been described above. The pruning in this embodiment will be described in detail later.

Referring back to FIG. 1, the training section 112 re-trains the pruned neural network with a data set (unillustrated). That is, the processing section 11 re-trains the pruned neural network. With this configuration, it is possible to optimize the weights in the pruned neural network, and to suppress a drop in the processing accuracy of the neural network.

The training section 112 need not be included in the machine learning apparatus 1. Training using a data set can be performed by any of well-known methods. The data set may be a set of teaching data containing learning data and correct answer labels. In this embodiment, the training section 112 outputs the trained neural network resulting from re-training to the edge device 2.

(1-2-2. Neural Network)

Figure 3:
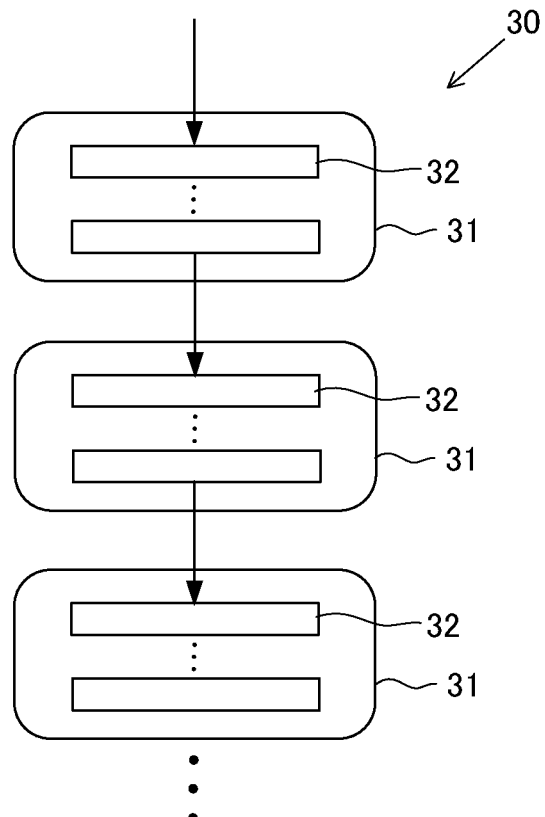
FIG. 3 is a schematic diagram in illustration of an example of the structure of a neural network.

FIG. 3 is a schematic diagram in illustration of an example of the structure of a neural network 30 on which pruning is to be performed by the processing section 11. The neural network 30 is, for example, a neural network for image recognition for image classification, object detection, or the like. The neural network 30 however is not limited to a neural network for image recognition, and may instead be a neural network for sound recognition or the like.

In the example shown in FIG. 3, the neural network 30 as the target of pruning has a plurality of stages 31 each including at least one block 32. Specifically, the neural network 30 has a structure composed of a plurality of stages 31 linked together. The numbers of blocks 32 included in different stages 31 may be equal or different. The plurality of stages 31 include at least one stage 31 that includes a plurality of blocks 32.

Figure 4:
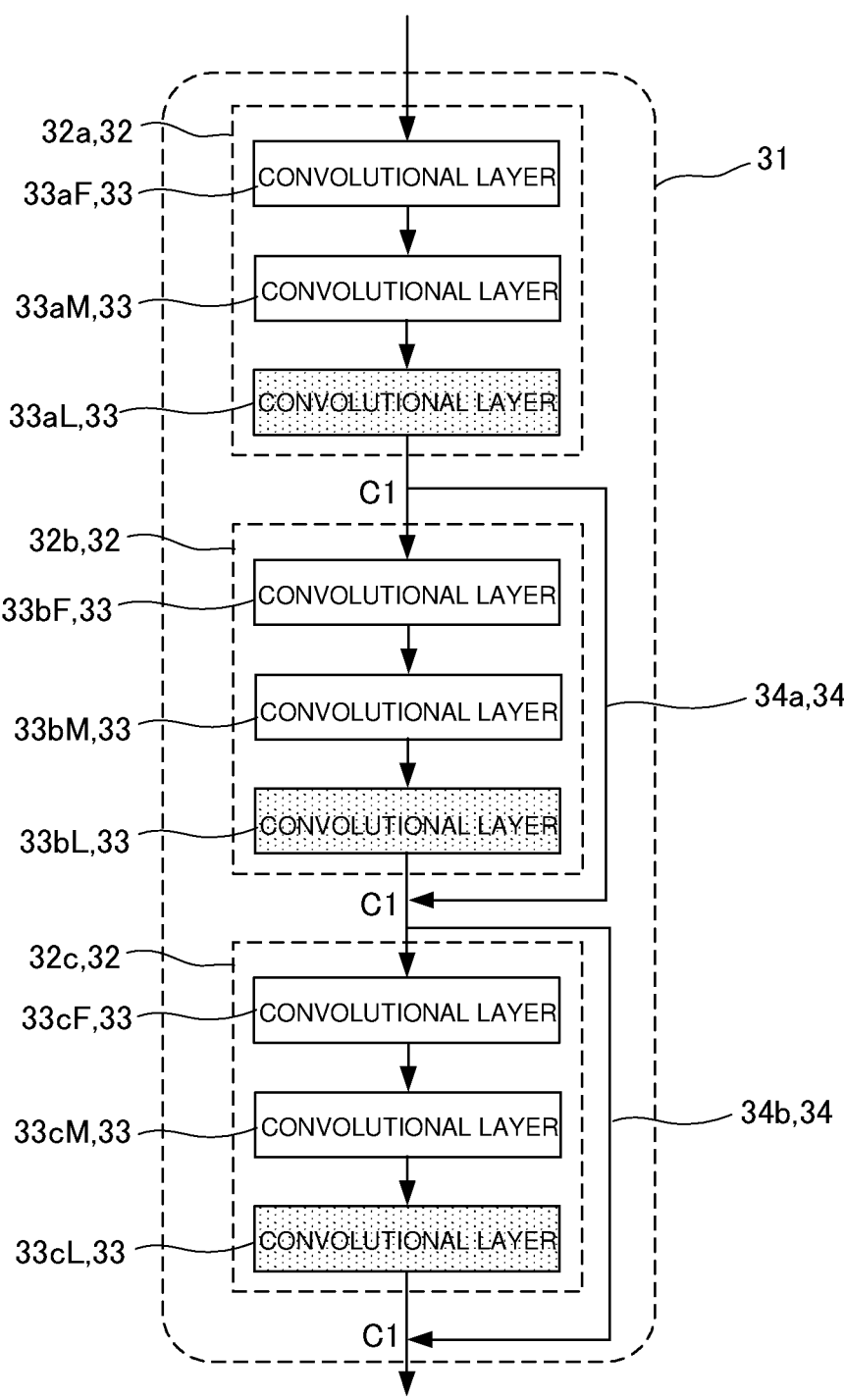
FIG. 4 is a schematic diagram showing an example of the structure of stages in a neural network.

FIG. 4 is a schematic diagram showing an example of the structure of a stage 31 in the neural network 30. In the example shown in FIG. 4, the stage 31 includes a plurality of blocks 32, specifically three blocks 32. As shown in FIG. 4, each block 32 includes a plurality of layers 33. In the example shown in FIG. 4, each block 32 includes three convolutional layers 33. The number of layers 33 included in each block 32 is not limited to three, and may instead be two, or four or more.

In the example shown in FIG. 4, the last convolutional layers in every block 32 included in the stage 31 are linked together by residual connection 34. Residual connection is synonymous with skip connection. Specifically, the stage 31 includes two residual connections 34. The first residual connection 34a links together the output of the last convolutional layer 33aL in the first block 32a and the output of the last convolutional layer 33bL in the second block 32b. The second residual connection 34b links together the output of the last convolutional layer 33bL in the second block 32b, the output of the last convolutional layer 33cL in the third block 32c, and the output via the first residual connection 34a of the last convolutional layer 33aL in the first block 32a. The number of residual connections 34 included in the stage 31 may be changed as necessary according to the number of blocks 32 included in the stage 31.

Between convolutional layers 33 of which the outputs are linked together by a residual connection 34, their elements are added up, so they have the same output channel configuration. Accordingly, the last convolutional layers 33 in every block 32 that are linked together by residual connections 34 have the same number of channels. In other words, within the stage 31, the blocks 32 all have the same number of output channels. In the example shown in FIG. 4, the last convolutional layer 33aL in the first block 32a, the last convolutional layer 33bL in the second block 32b, and the last convolutional layer 33cL in the blocks 32 have the same number C1 of output channels. In other words, the three blocks 32a, 32b, and 32c each have C1 output channels.

In this embodiment, in different stages 31, blocks 32 have different numbers of output channels. In other words, a stage 31 is a set of blocks 32 that have the same number of output channels. For example, in a case where the neural network 30 has five stages 31, the first, second, third, fourth, and fifth stages have 24, 40, 80, 120, and 160 channels, for instance, in the order named. Incidentally, no residual connections 34 are defined that link between stages 31.

The neural network 30 configured as described above may be implemented with a well-known architecture such as ResNet or NobileNet V2. For example, with ResNet, each block 32 includes two layers. For another example, with NobileNet V2, each block 32 includes three layers.

In the configuration described above, residual connections 34 link together the last layers 33 in every block 32. This is only illustrative. It is only preferable that the neural network as the target of pruning include residual connections. For example, residual connections may link together the middle layers 33 (e.g., the layers 33aM and 33bM) in every block 32.

(1-2-3. Pruning in Detail)

In this embodiment, pruning includes a first pruning process and a second pruning process that differ from each other. This configuration permits different schemes of pruning to be used according to the configuration of the neural network 30. Using different schemes permits proper removal of weights and nodes in the neural network 30, and helps simultaneously improve computation efficiency and suppress a drop in processing accuracy in the neural network 30.

Specifically, the first and second pruning processes differ in units of elements in which to perform pruning with respect to the elements constituting the neural network 30. This configuration permits use of different pruning schemes according to differences in local structures in the neural network 30, and allows proper removable of weights and nodes in the neural network 30.

Specifically, in the first pruning process, pruning is performed in units of channels of convolutional layers; in the second pruning process, pruning is performed in units of weight parameters. Units of channels are, compared with units of weight parameters, larger units of elements in which to perform pruning with respect to the elements constituting the neural network 30. That is, the first pruning process, compared with the second pruning process, performs pruning in larger units of elements with respect to the elements constituting the neural network 30. Incidentally, roughly put, pruning in units of channels is pruning that resembles pruning in units of neurons (nodes) in FIG. 2 described above. On the other hand, roughly put, pruning in units of weight parameters is processing that resembles pruning in units of weights in FIG. 2 described above.

As described above, the neural network 30 includes residual connections 34. This configuration requires that the layers 33 that are linked together by residual connections 34 be configured similarly in terms of their output channels. Accordingly, such layers 33 as are linked together by residual connections 34 cannot by themselves be subjected to pruning in units of channels. That is, in a case where the layers 33 that are linked together by residual connections 34 need to be subjected to pruning in units of channels, pruning has to be performed with consideration given to the importance level of each channel in those layer 33s that are linked together. That is, pruning tends to be complicated.

Moreover, in a case where, between the layers 33 that are linked together by residual connections 34, the numbers of unnecessary channels differ, pruning needs to be performed to suit the layer 33 with the fewer unnecessary channels. Thus, in the layer 33 with the more unnecessary channels, some channels are left untouched, and this may diminish the effect of pruning in units of channels.

Furthermore, pruning is generally performed by a method that determines the proportion of weight parameters to be pruned off throughout the entire neural network 30. In this case, due to the above-mentioned restraint associated with pruning in units of channels for the layers linked together by residual connections 34, pruning tends to be performed with priority to layers 33 other than those linked together by residual connections 34. This may result in a drop in the processing accuracy of the neural network 30 obtained through pruning.

In this respect, according to this embodiment, appropriate use of a pruning process in units of channels and a pruning process in units of weight parameters permits adequate pruning without a complicated pruning process or uneven treatment of pruning targets. It is thus possible to simultaneously improve computation efficiency and suppress a drop in processing accuracy in the neural network 30.

Specifically, the processing section 11 excludes from the target of the first pruning process (pruning process in units of channels) at least part of the layers 33 of which the outputs are linked together by residual connections 34. The layers 33 excluded from the target of the first pruning process are subjected to the second pruning process (pruning process in units of weight parameters). With this configuration, it is possible to perform adequate pruning while avoiding complicating the processing for the layers 33 of which the outputs are linked together by residual connections 34.

In the example shown in FIG. 4, the last convolutional layers 33aL, 33bL, and 33cL in every block 32a, 32b, and 32c are excluded from the target of the first pruning process (pruning in units of channels). These convolutional layers 33aL, 33bL, and 33cL are taken as the target of the second pruning process (pruning in units of weight parameters). The first convolutional layers 33aF, 33bF, and 33cF and the middle convolutional layers 33aM, 33bM, and 33cM in every block 32 are taken as the target of the first pruning process.

The first convolutional layers 33aF, 33bF, and 33cF and the middle convolutional layers 33aM, 33bM, and 33cM in every block 32 may be subjected to the first pruning process alone. Or, the first convolutional layers 33aF, 33bF, and 33cF and the middle convolutional layers 33aM, 33bM, and 33cM in every block 32 may be subjected to, as well as the first pruning process, the second pruning process.

Figure 5:
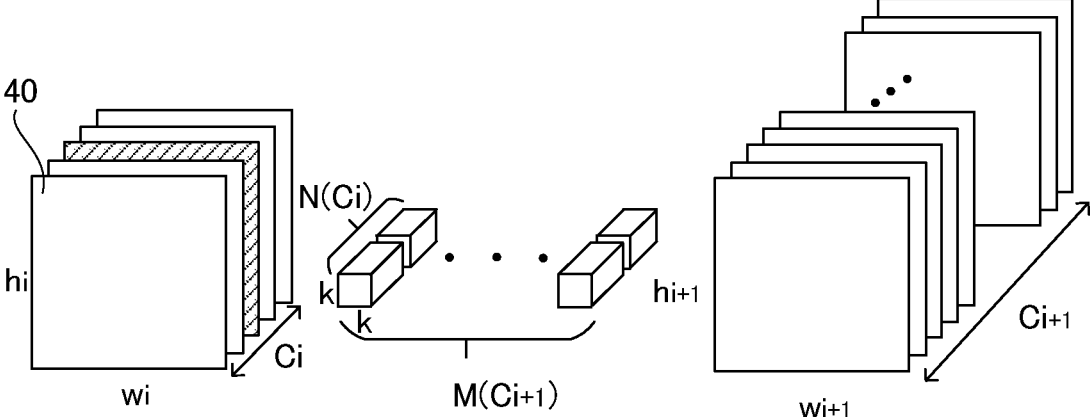
FIG. 5 is a diagram in illustration of one example of a first pruning process.

FIG. 5 is a diagram in illustration of one example of the first pruning process. In FIG. 5, "i" represents the number of a convolutional layer 33, "C" represents the number of channels, and "w" and "h" represent the width and height, respectively, of a feature map 40. A smaller value of i indicates more closeness to the input layer, and a larger value of i indicates more closeness to the output layer. The weight of a convolutional layer 33 is configured as an M×N array of convolutional filters (kernels) with a size of k×k. The number of rows M corresponds to the number of channels ($C_{i+1}$) in the output feature map 40. The number of columns N corresponds to the number of channels (Ci) in the input feature map 40.

In the example shown in FIG. 5, for each convolutional filter, the absolute value sum of weight parameters is calculated. For example, in a case where the convolutional filter has a size of 3×3, the absolute value sum of nine weight parameters is calculated. For each input channel (for each column), the total of the so calculated absolute value sums (the total of M absolute value sums) is calculated as an evaluation value. For an input channel with a small evaluation value, the convolutional filter of the input channel and the feature map 40 corresponding to that input channel are deleted. Moreover, in the convolutional layer 33 (unillustrated in FIG. 5) immediately preceding the convolutional layer 33 from which the output feature map 40 has been deleted, the corresponding output channel in the group of convolutional filters is deleted. For example, a predefined number of input channels in increasing order of evaluation values are taken as the target of deletion.

In FIG. 5, one input channel is taken as the target of deletion, so all the convolutional filters included in the deletion-targeted input channel and the feature map 40 corresponding that input channel, i.e., the hatched one, are deleted. Moreover, in the convolutional layer 33 (unillustrated in FIG. 5) immediately preceding the convolutional layer 33 from which the output feature map 40 has been deleted, the corresponding output channel in the group of convolutional filters is deleted. Instead of the absolute value sums mentioned above, for example, the sums of squares or the maximum values of absolute values may be used.

Figure 6:
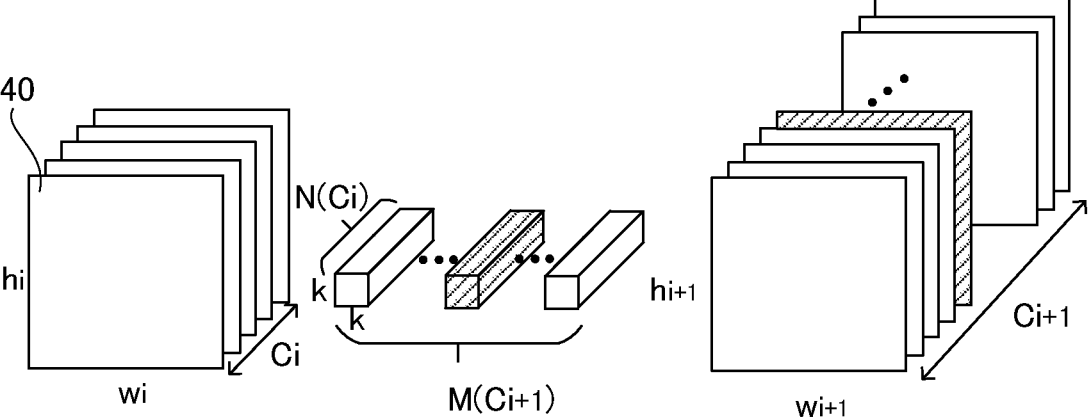
FIG. 6 is a diagram in illustration of another example of the first pruning process.

FIG. 6 is a diagram in illustration of another example of the first pruning process. In FIG. 6, as in FIG. 5, "i"

represents the number of a convolutional layer 33, "C" represents the number of channels, and "w" and "h" represent the width and height, respectively, of a feature map 40. A smaller value of i indicates more closeness to the input layer, and a larger value of i indicates more closeness to the output layer. The weight of a convolutional layer 33 is configured as an M×N array of convolutional filters with a size of k×k. The number of rows M corresponds to the number of channels ($C_{i+1}$) in the output feature map 40. The number of columns N corresponds to the number of channels (Ci) in the input feature map 40.

Also in the example shown in FIG. 6, for each convolutional filter, the absolute value sum of weight parameters is calculated. In the example shown in FIG. 6, however, for each output channel (for each row), the total of the calculated absolute value sums (the total of N absolute value sums) is calculated as an evaluation value. For an output channel with a small evaluation value, the convolutional filter of the output channel and the feature map 40 corresponding to that output channel are deleted. Moreover, in the convolutional layer 33 (unillustrated in FIG. 6) immediately succeeding the convolutional layer 33 from which the output feature map 40 has been deleted, the corresponding input channel in the group of convolutional filters is deleted. For example, a predefined number of output channels in increasing order of evaluation values are taken as the target of deletion.

In FIG. 6, one output channel is taken as the target of deletion, so all the convolutional filters included in the deletion-targeted output channel and the feature map 40 corresponding that output channel, i.e., the hatched one, are deleted. Moreover, in the convolutional layer 33 (unillustrated in FIG. 6) immediately succeeding the convolutional layer 33 from which the output feature map 40 has been deleted, the corresponding input channel in the group of convolutional filters is deleted. As with the example shown in FIG. 5, instead of the absolute value sums mentioned above, for example, the sums of squares or the maximum values of absolute values may be used.

The pruning process shown in FIG. 5 performs pruning for reducing the number of input channels, that is, what is called channel pruning. The pruning process shown in FIG. 6 performs pruning for reducing the number of output channels, that is, what is called filter pruning. As will be understood from the description thus far, in both FIGS. 5 and 6, pruning is performed in units of channels. In pruning in units of channels, of the data of the convolutional layers 33 mapped in the memory included in the storage section 12 (see FIG. 1), the data of the convolutional filters of the channels determined to be the target of pruning and the feature maps corresponding to those channels is deleted.

As mentioned above, the second pruning process performs pruning in units of weight parameters, which are units smaller than units of channels. The convolutional filter with a size of k×k mentioned above has k×k weight parameters. In other words, weight parameters are the values of the individual elements of a convolutional filter with a size of k×k. For example, a convolutional filter with a size of 3×3 includes nine (=3×3) weight parameters. In the second pruning process, which is performed in units of weight parameters, for example, if a weight parameter has an absolute value smaller than a predefined threshold value, that weight parameter is given a value of zero. Specifically, of the data of the convolutional layers 33 mapped in the memory, the weight parameters determined to be the target of pruning are given a value of zero. Instead of the absolute value, for example, a square value may be used. If any weight parameters are given a value of zero through pruning, the edge device 2 (see FIG. 1) that uses the pruned neural network performs processing while skipping calculation for any part where weight parameters have a value of zero. This helps improve computation efficiency even in pruning in units of weights.

A predetermined number of weight parameters in increasing order of absolute values may be given a value of zero. As another method, for example, weight parameters that do not affect the performance (e.g., recognition rate) of the neural network 30 may be exploratorily searched for.

In the second pruning process, which is performed in units of weight parameters, the units of elements in which pruning is performed on the neural network 30 is smaller than that in the first pruning process, which is performed in units of channels. Thus the second pruning process helps suppress a drop in accuracy compared with the first pruning process.

<1-3. Machine Learning Method>

Figure 7:
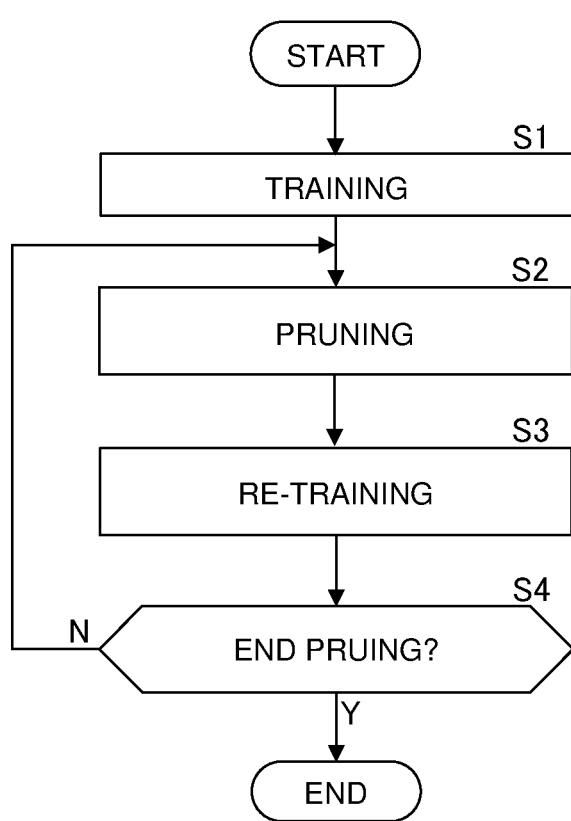
FIG. 7 is a flow chart showing one example of a machine learning method including pruning according to a first embodiment.

Next, a machine learning method using a pruning scheme according to a first embodiment of the present invention will be described. FIG. 7 is a flow chart showing one example of a machine learning method including pruning according to the first embodiment of the present invention.

At step S1, the neural network 30 is trained. The training is performed using a data set (unillustrated). The data set can be a set of teaching data containing learning data and correct answer labels. The training is prior training as mentioned earlier. The prior training may be performed on the machine learning apparatus 1 or on any other apparatus. On completion of the training, an advance is made to the subsequent step, S2.

Figure 8:
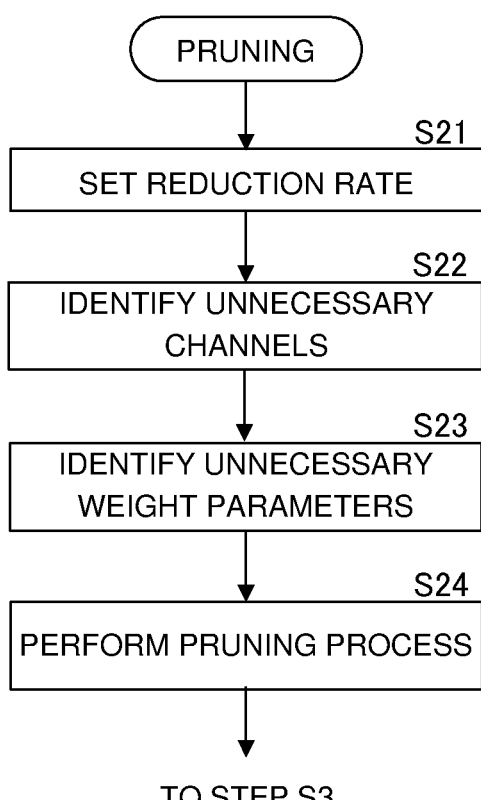
FIG. 8 is a flow chart showing a procedure of pruning according to the first embodiment.

At step S2, the processing section 11 in the machine learning apparatus 1 performs pruning on the trained neural network 30. On completion of the pruning, an advance is made to the subsequent step, S3. Prior to a description of step S3, the procedure of pruning will be described with reference to FIG. 8. FIG. 8 is a flow chart showing the procedure of pruning according to the first embodiment. Specifically, FIG. 8 is a flow chart showing a detailed procedure of the pruning at step S2 in FIG. 7.

At step S21, a reduction rate for weight parameters is set. The reduction rate is the rate by which to reduce weight parameters out of all the weight parameters that the trained neural network 30 has. A weight parameter can be reduced either by giving it a value of zero or by deleting the weight parameter itself. For example, a person such as a developer of the neural network 30 sets the reduction rate. The setting of the reduction rate on the machine learning apparatus 1 by a human is performed using an unillustrated input device. The reduction rate may be set automatically by the machine learning apparatus 1.

As the reduction rate, only one value may be set; in this embodiment, a plurality of values are set such that the reduction rate increases stepwise. The aim is to obtain a configuration where the reduction rate is increased every time pruning is performed starting when it is performed for the first time. The reduction rate is set, for example, in a form like 20%, 25%, 30%, . . . . On completion of the setting of the reduction rate, an advance is made to the subsequent step, S22.

At step S22, the processing section 11 identifies unnecessary channels in the trained neural network 30. The process of identifying unnecessary channels is included in above-described first pruning process, which is performed in units of channels. Of the plurality of layers 33 included in the neural network 30, those of which the outputs are linked together by residual connections 34 are excluded from the target of unnecessary channel identification. For example, a predetermined number of channels in increasing order of evaluation values as described above are identified as unnecessary channels. The predetermined number can be determined automatically according to the reduction rate. On completion of the unnecessary channel identification, an advance is made to the subsequent step, S23.

At step S23, the processing section 11 identifies unnecessary weight parameters in the trained neural network 30. The process of identifying unnecessary weight parameters is included in above-described second pruning process, which is performed in units of weight parameters. In this embodiment, the process of identifying unnecessary weight parameters is performed taking all the layers 33 included in the neural network 30 as the target. Any weight parameters included in the channels already identified as unnecessary may be excluded from the target of the process. For example, unnecessary weight parameters are identified in increasing order of absolute values according to the results of the unnecessary channel identification performed previously and the reduction rate. On completion of the unnecessary weight parameter identification, an advance is made to the subsequent step, S24.

Steps S22 and S23 may be performed in the reversed order.

At step S24, the processing section 11 performs a process of pruning off the channels and weight parameters that have been identified as unnecessary at the previous steps S22 and S23. The pruning process at step S24 includes part of the first pruning process and part of the second pruning process. On completion of the pruning process, an advance is made to step S3 shown in FIG. 7.

As will be understood from the above, the processing section 11 identifies, out of the plurality of layers 33 constituting the neural network 30, those layers 33 which are to be excluded from the target of the first pruning process, and performs the first pruning process taking as the target the layers other than the so identified layers 33. In other words, the processing section 11 identifies, out of the plurality of layers 33 constituting the neural network 30, those layers 33 which are to be taken as the target of the first pruning process, and performs the first pruning process with the so identified layers 33. It is thus possible to obtain a configuration where the first pruning process is not performed on such layers 33 as are unfit for the first pruning process, which performs pruning in units of channels. For example, at least part of the layers 33 of which the outputs are linked together by residual connections 34 can be excluded from the target of the first pruning process. On the other hand, such layers 33 as are fit for pruning in units of channels are subjected to pruning in units of channels, and this helps suppress a drop in the effect of pruning.

The processing section 11 then performs the second pruning process taking as the target those of the plurality of layers 33 which have been identified as out of the target of the first pruning process. In other words, the processing section 11 performs the second pruning process taking as the target those of the plurality of layers 33 which are different from the layers 33 identified as the target of the first pruning process. With this configuration, such layers 33 as are not subjected to the first pruning process are taken as the target of the second pruning process, and this helps suppress an extreme drop in the effect of pruning. For example, for the layers 33 of which the outputs are linked together by residual connections 34, pruning can be performed in units of weight parameters. Incidentally, in the second pruning process performed taking layers 33 as the target, the weight parameters between those layers are the target of pruning.

The processing section 11 further performs the second pruning process taking as the target the layers 33 other than the layers 33 identified as out of the target of the first pruning process. In other words, the processing section 11 further performs the second pruning process further taking as the target the layers 33 identified as the layers 33 to be taken as the target of the first pruning process. With this configuration, also the layer 33 taken as the target of the first pruning process can be taken as the target of the second pruning process. This helps avoid insufficient pruning, and is expected to improve the computation efficiency of the neural network 30 having undergone the processes. This is the configuration described above. Instead, the processing section 11 may not perform the second pruning process taking as the target the layers 33 taken as the target of the first pruning process.

Referring back to FIG. 7, at step S3, the processing section 11 re-trains the pruned neural network 30 using a data set. On completion of the re-training, an advance is made to the subsequent step, S4.

At step S4, the processing section 11 checks whether or not to end pruning. For example, if the processing accuracy of the pruned neural network 30 is equal to or lower than a previously set threshold value, the processing section 11 determines to end pruning. For another example, if the time that the pruned neural network 30 requires to execute a task (such as image recognition) is equal to or less than a previously set target value, the processing section 11 determines to end pruning. When a determination to end pruning is made (step S4, Yes), the procedure shown in FIG. 7 ends. When a determination not to end pruning is made (step S4, No), a return is made to step S2, so that step S2 and the following steps are repeated.

When a return is made to step S2, pruning is performed with the value of the reduction rate changed to one larger than the one previously used. The neural network 30 obtained through the procedure shown in FIG. 7 is delivered to, for example, the edge device 2.

Figure 9:
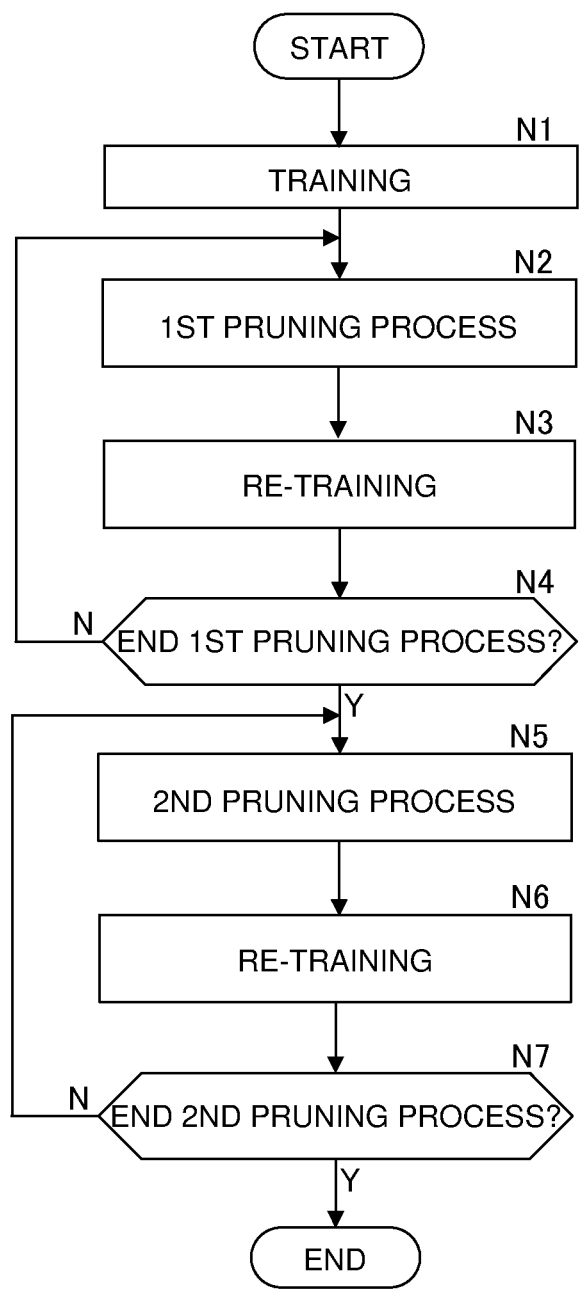
FIG. 9 is a flow chart showing a modified example of the machine learning method including pruning according to the first embodiment.

While the above description deals with a configuration where the first and second pruning processes are performed together, they may be performed one after the other as shown in FIG. 9. FIG. 9 is a flow chart showing a modified example of a machine learning method including pruning according to the first embodiment.

First, at step N1, a trained neural network is subjected to the first pruning process (step N2). A reduction rate is set, and pruning is performed in units of channels. Here, the layers 33 of which outputs are linked together by residual connections 34 are excluded from the target of pruning.

After the first pruning process, re-training is performed (step N3), and then whether to end the first pruning process is determined (step N4). For example, if the processing accuracy of the neural network having undergone the first pruning process is equal to or lower than a previously set threshold value, a determination to end the first pruning process is made. If the first pruning process is not ended (step N4, No), a return is made to step N2, so that step N2 and the following steps are repeated.

If the first pruning process is ended (step N4, Yes), the neural network having undergone the first pruning process is subjected to the second pruning process (step N5). A reduction rate is set, and pruning is performed in units of weight parameters. In this example, all the layers including those of which the outputs are linked together by residual connections are taken as the target of pruning.

After the second pruning process, re-training is performed (step N6), and then whether to end the second pruning process is determined (step N7). For example, if the processing accuracy of the pruned neural network is equal to or lower than a previously set threshold value, a determination to end the second pruning process is made. If the second pruning process is not ended (step N7, No), a return is made to step N5, so that step N5 and the following steps are repeated. When the second pruning process is ended (step N7, Yes), the procedure shown in FIG. 9 ends. The neural network obtained through the procedure shown in FIG. 9 is delivered to, for example, the edge device 2.

This modified example deals with a configuration were first the first pruning process and then the second pruning process is performed. Instead, a configuration is also possible where first the second pruning process and then the first pruning process is performed.

2. Second Embodiment

Next, a machine learning apparatus, and a machine learning method including a pruning method, according to a second embodiment will be described. The machine learning apparatus according to the second embodiment is configured similarly to the machine learning apparatus 1 according to the first embodiment shown in FIG. 1. In the following description, the machine learning apparatus according to the second embodiment will be identified as the machine learning apparatus 1A. In the following description of the second embodiment, for such features as find counterparts in the first embodiment, no description will be repeated unless necessary, and focus is placed on those features that are not found in the first embodiment. In the following description of the second embodiment, such elements as find counterparts in the first embodiment will be identified by the same reference signs.

The machine learning apparatus 1A can be employed in the machine learning system 100 (see FIG. 1) described above. The machine learning apparatus 1A includes a processing section 11 that performs pruning on a neural network. In other words, the apparatus 1A implements a method of performing pruning on a neural network. What is referred to as a neural network here is, as in the first embodiment, a trained neural network 30 that has undergone prior training. The neural network has a structure similar to, for example, that described above with reference to FIGS. 3 and 4. Specifically, the neural network 30 is a convolutional neural network (CNN).

The pruning according to the second embodiment differs from that according to the first embodiment in that all of the plurality of layers 33 (see FIG. 4) constituting the neural network 30 are included in the target of the first pruning process (pruning in units of channels) described above. The following description focuses on such differences.

Figure 10:
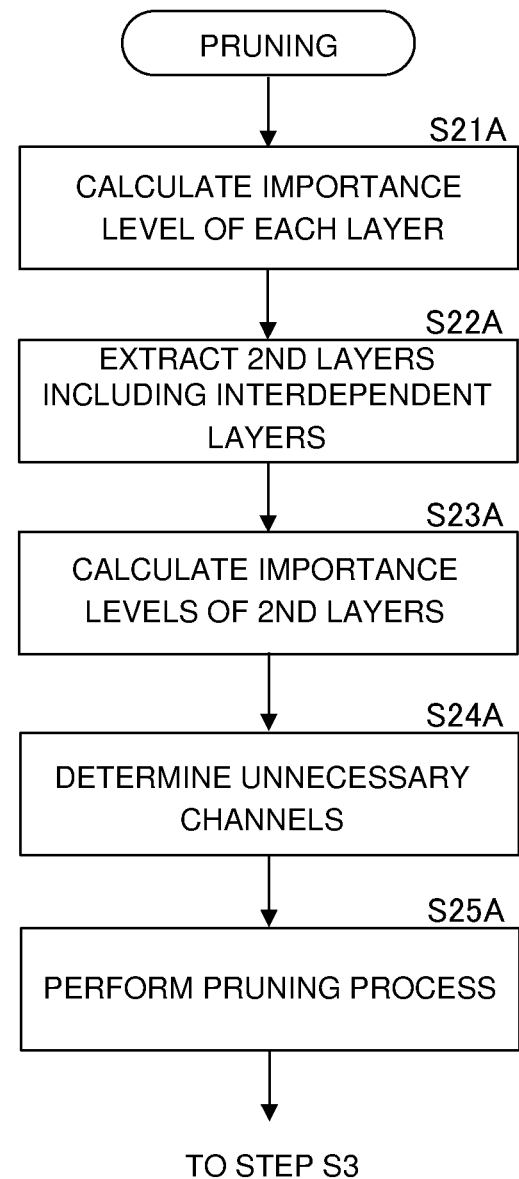
FIG. 10 is a flow chart showing a procedure of pruning according to a second embodiment.

FIG. 10 is a flow chart showing the procedure of pruning according to the second embodiment.

The overall procedure of the machine learning method including pruning according to the second embodiment can be similar to that of the flow chart in FIG. 7, which shows the machine learning method according to the first embodiment. That is, the machine learning method including pruning according to the second embodiment can be configured to perform pruning on a trained neural network 30 and then, after the pruning, re-train (fine-tune) it; it can be so configured that thereafter, until the re-trained neural network meets a predetermined requirement, pruning and re-training are repeated. However, in the machine learning method including pruning according to the second embodiment, the pruning at step S2 in FIG. 7 differs in specifics from that described above according to the first embodiment. FIG. 10 is a flow chart showing the specifics of the pruning different from that according to the first embodiment.

At step S21A, the processing section 11 determines the importance level of each of the plurality of layers 33 (see FIG. 4) constituting the neural network 30. The importance level is determined to determine the target of pruning. That is, the processing section 11 performs pruning according to the importance level determined for each of the plurality of layers 33 constituting the neural network 30. In yet other words, pruning is performed according to the importance level determined for each of the plurality of layers 33 constituting the neural network 30.

Specifically, an importance level is determined for each channel in each of the plurality of the layers 33. This permits pruning to be performed in units of channels. In this embodiment, as will be described in detail later, pruning is performed in units of channels according to the importance level determined for each channel. By performing pruning in units of channels, it is possible to perform pruning efficiently as compared with performing pruning in units of weight parameters.

The importance level for each channel in each layer 33 is determined using the above-mentioned convolutional filter (see, for example, FIGS. 5 and 6) with a size of k×k that is used in convolution calculation. The importance level of each channel can be the evaluation value for each input channel as described with reference to FIG. 5 or the evaluation value for each output channel as described with reference to FIG. 6. The importance level of each channel can be the average value (L1-Norm) of the absolute values of weight parameters for each input channel or the square average value (L2-Norm) of weight parameters for each input channel. The importance level of each channel can be the average value of the absolute values of weight parameters for each output channel or the square average value of weight parameters for each output channel. On completion of the determination of the importance level for each channel in each layer 33, an advance is made to the subsequent step, S22A.

Prior to a description of step S22A, a description will be given of the configuration of the neural network 30 according to this embodiment. The neural network 30 according to this embodiment includes first layers, among which no layers are interdependent with each other, and second layers, among which some layers are interdependent with each other. In this embodiment, layer 33 that are interdependent with each other are layers that are associated with each other by residual connections 34 (see FIG. 4).

As mentioned above, layers 33 that are linked together by residual connections 34 have to have the same number of output channels. Performing pruning in units of channels for each layer 33 independently may produce a difference in the number of channels among layers 33 that are linked together by residual connections 34. Thus, pruning cannot be performed in units of channels for each layer 33 independently among layers 33 that are linked together by residual connections 34. Pruning may be performed with layers 33 that are linked together by residual connections 34 excluded from the target of the pruning. In that case, however, pruning concentrates on particular layers 33 and this is likely to lead a drop in the processing accuracy of the pruned neural network 30. The pruning scheme according to this embodiment is suitable for the pruning of a neural network 30 that includes residual connections 34 like the one just mentioned.

At step S22A, the processing section 11 extracts, out of the plurality of layers 33 constituting the neural network 30, second layers, which include layers 33 that are interdependent with each other. Since, as mentioned above, layers 33 that are interdependent with each other are layers that are associated with each other by residual connections 34, second layers can be also termed as layers 33 which include layers that are associated with each other by residual connections 34. In terms of the example shown in FIG. 4, the last convolutional layer 33aL in the first block 32a, the last convolutional layer 33bL in the second block 32b, and the last convolutional layer 33cL in the third block 32c correspond to second layers.

In other words, the last convolutional layer 33aL in the first block 32a, which is a second layer, is interdependent with the last convolutional layer 33bL in the second block 32b and the last convolutional layer 33cL in the third block 32c; the last convolutional layer 33bL in the second block 32b, which is a second layer, is interdependent with the last convolutional layer 33aL in the first block 32a and the last convolutional layer 33cL in the third block 32c; the last convolutional layer 33cL in the third block 32c, which is a second layer, is interdependent with the last convolutional layer 33aL in the first block 32a and the last convolutional layer 33bL in the second block 32b. As will be seen from what has just been mentioned, in the example shown in FIG. 4, a second layer is interdependent with two layers among the plurality of layers 33. Note that this is merely illustrative; that is, a second layer need be interdependent with at least one layer 33 among the plurality of layers 33. The number of layers 33 that are interdependent with each other may be odd or even. With this configuration, it is possible to cope with neural networks with varying configurations.

The example shown in FIG. 4 deals with only one of the stages 31 constituting the neural network 30. Any other of the stages 31 constituting the neural network 30 may include a second layer. At step S22A, when all the second layers have been extracted, an advance is made to the subsequent step, Step S23A.

At step S23A, the processing section 11 calculates the importance levels of second layers, which include layers 33 that are interdependent with each other among the plurality of layers 33. For second layers, as will be described later, pruning is performed according to the importance levels calculated at step S23A. That is, for second layers, not the importance levels determined at step S21A but the importance levels determined at step S23A are used to determine the target of pruning.

The importance level of a second layer is determined by classifying layers that are interdependent with each other into a group. That is, for second layers, which include layers 33 that are interdependent with each other among the plurality of layers 33, an importance level is determined by classifying layers 33 that are interdependent with each other among the plurality of layers 33 into a group. Specifically, the layers 33 so classified into a group are given the same importance level. The number of layers 33 included in one group may be any even or odd number of two or more.

For first layers, which include no layers 33 that are interdependent with each other among the plurality of layers 33, pruning is performed according to the importance levels determined at step S21A. That is, for first layers, which include no layers 33 that are interdependent with each other among the plurality of layers 33, an importance level is determined for each layer 33. Specifically, for first layers, an importance level is determined for each layer 33 independently. In the example shown in FIG. 4, two convolutional layers 33aF and 33aM in the first block 32a, two convolutional layers 33bF and 33bM in the second block 32b, and two convolutional layers 33cF and 33cM in the third block 32c correspond to first layers.

As will be understood from what has been described above, in this embodiment, importance levels are calculated differently between first layers, which include no layers 33 that are interdependent with each other among the plurality of layers 33, and second layers, which include layers 33 that are interdependent with each other. For second layers, which include layers 33 that are interdependent with each other, layers 33 that are interdependent with each other are classified into a group so as to have a common importance level. Thus, with the configuration of this embodiment, it is possible to prevent, when pruning is performed according to importance levels, occurrence of a difference in the number of channels among layers 33 that are interdependent with each other. Moreover, it is possible to perform pruning also for second layers, which include layers 33 that are interdependent with each other, and thereby to prevent pruning from being performed lopsidedly with first layers, which include no layers that are interdependent with each other. Thus, according to this embodiment, it is possible to simultaneously achieve improved computation efficiency and a suppressed drop in processing accuracy in the pruned neural network.

Figure 11:
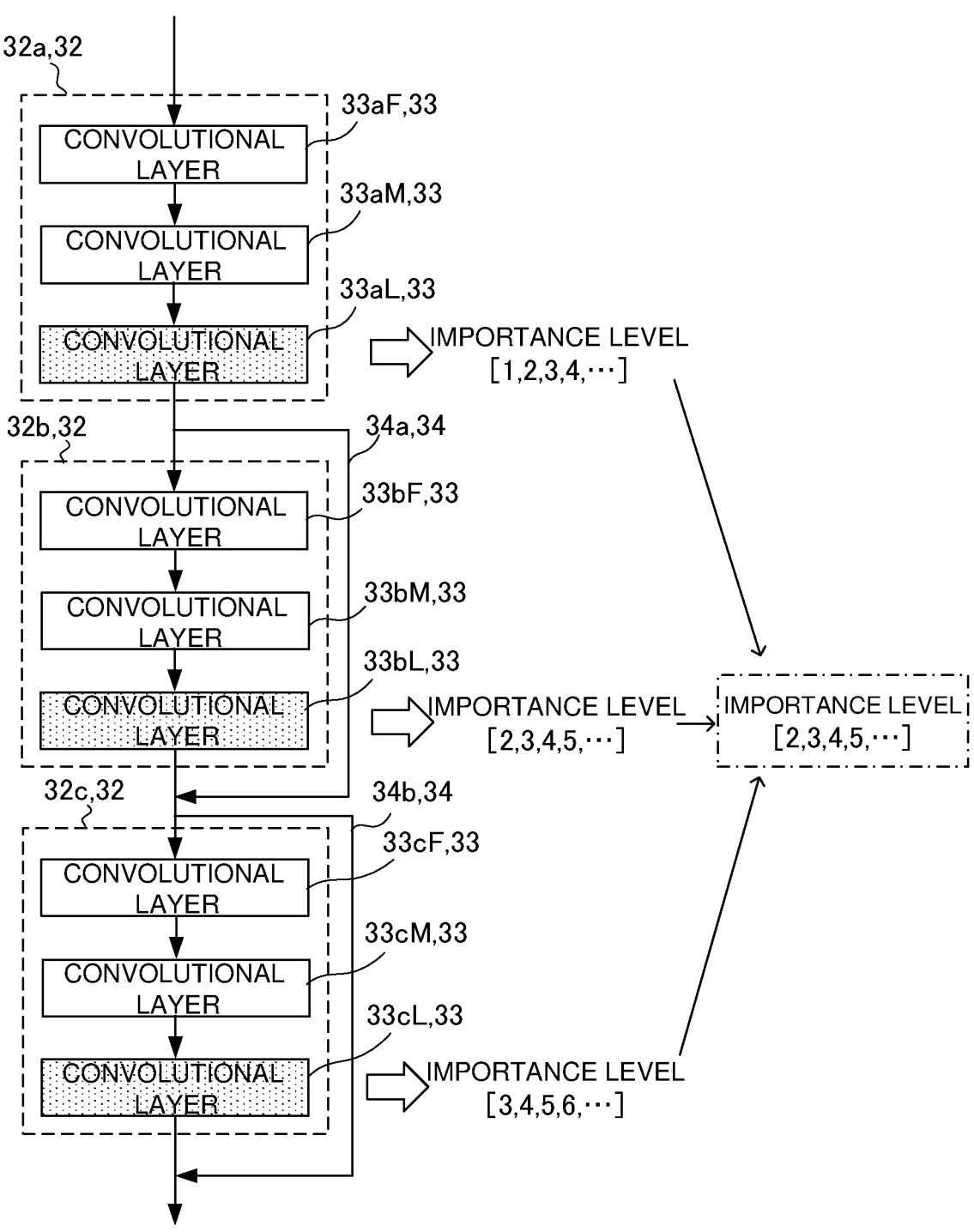
FIG. 11 is a diagram in illustration of how to determine the importance levels of second layers.

Now, with reference to FIG. 11, a specific example of how the importance levels of second layers are determined will be described. FIG. 11 is a diagram in illustration of how to determine the importance levels of second layers. The neural network 30 in FIG. 11 (precisely, part of a neural network 30) is the same as the neural network 30 shown as an example in FIG. 4. In FIG. 11, the three convolutional layers 33aL, 33bL, and 33cL indicated by hatching are second layers.

As shown in FIG. 11, for second layers, an importance level is the value resulting from averaging the importance level determined for each of the layers 33 classified into a group. Specifically, for second layers, an importance level is determined for each channel, and the importance level for each channel is the value resulting from averaging, for each channel, the value determined for each channel in each of the layers 33 classified into a group. Using an average value makes it easy to determine the importance level of each of the layers classified into a group.

In the example shown in FIG. 11, the importance level of the convolutional layer 33aL on its own, which is a second layer, is "1" for the first channel, "2" for the second channel, "3" for the third channel, and "4" for the fourth channel; the importance level of the convolutional layer 33bL on its own, which is a second layer, is "2" for the first channel, "3" for the second channel, "4" for the third channel, and "5" for the fourth channel; the importance level of the convolutional layer 33cL on its own, which is a second layer, is "3" for the first channel, "4" for the second channel, "5" for the third channel, and "6" for the fourth channel. The three convolutional layers 33aL, 33bL, and 33cL are linked together by residual connections 34, thus are interdependent with each other, and thus are classified into one group.

The importance level for each channel in each of the three convolutional layers 33aL, 33bL, and 33cL is the value resulting from averaging, for each channel, the importance level determined for each channel in the convolutional layers 33aL, 33bL, and 33cL. Specifically, the importance level for the first channel in the convolutional layers 33aL, 33bL, and 33cL is "2"=(1+2+3)/3; the importance level for the second channel in the convolutional layers 33aL, 33bL, and 33cL is "3"=(2+3+4)/3; the importance level for the third channel in the convolutional layers 33aL, 33bL, and 33cL is "4"=(3+4+5)/3; and the importance level for the fourth channel in the convolutional layers 33aL, 33bL, and 33cL is "5"=(4+5+6)/3.

While in this embodiment an importance level for second layers is the value resulting from averaging the importance level determined for each of the layers 33 classified into a group, this is merely illustrative; instead of an average value, a median values or the like may be used. An importance level for second layers may be a value determined with a variable weight assigned to it according to the number of layers 33 constituting a group. For example, as the number of layers 33 constituting a group increases, the weight may be increased. An importance level for second layers may be, instead of a simple average value, a weighted average value or the like.

Referring back to FIG. 10, on completion of the calculation of importance levels through grouping for all the second layers extracted at step S22A, an advance is made to the subsequent step, S24A.

At step S24A, the processing section 11 determines unnecessary channels. Unnecessary channels are channels taken as the target of pruning. In this embodiment, the processing section 11 takes as the target of pruning a predetermined proportion of channels in increasing order of importance levels as determined for each channel. The processing section 11 takes as the target of pruning a predetermined proportion of channels in increasing order of importance levels. There is no restriction on the predetermined proportion, which is, for example, 20%. The predetermined proportion may be set by a human, or may be set automatically by the apparatus. By determining the target of pruning as in this embodiment, it is possible to prevent too large or small number of channels from being taken as the target of pruning, and thus to perform pruning stably.

Unnecessary channels may be determined in any manner other than as in this embodiment. For example, the importance level determined for each channel may be compared with a previously set threshold value so that any channel with an importance level lower than the previously set threshold value is determined as an unnecessary channel.

Figure 12:
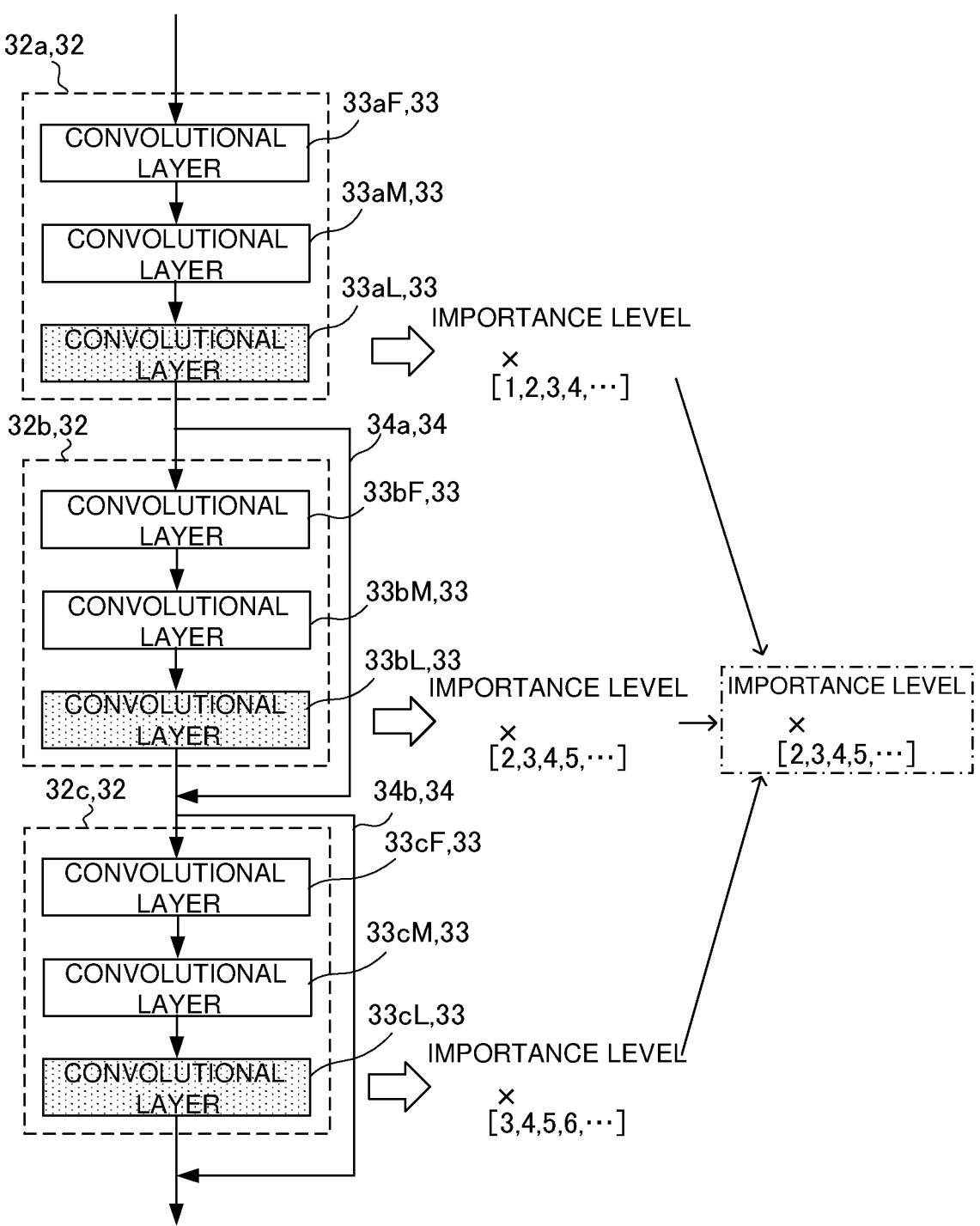
FIG. 12 is a diagram in illustration of how to determine unnecessary channels.

Now, with reference to FIG. 12, how unnecessary channels in second layers are determined will be described. FIG. 12 is a diagram in illustration of how to determine unnecessary channels in second layers. FIG. 12 presupposes that, as in FIG. 11, the importance levels of three convolutional layers 33aL, 33bL, and 33cL, which are second layers, have been determined. And it is assumed that channels with importance levels of two or less fall within a predetermined proportion in increasing order of importance levels. That is, it is assumed that channels with importance levels of two or less are determined as unnecessary channels. In FIG. 12, a channel of which the importance level is indicated by a figure marked with a cross (x) is an unnecessary channel.

Of the importance level of each of the channels determined through grouping (the importance levels surrounded by a dash-and-dot line), only that of the first channel is two or less. Accordingly, for the three convolutional layers 33aL, 33bL, and 33cL, which are second layers, only the first channel is determined as an unnecessary channel.

Figure 13:
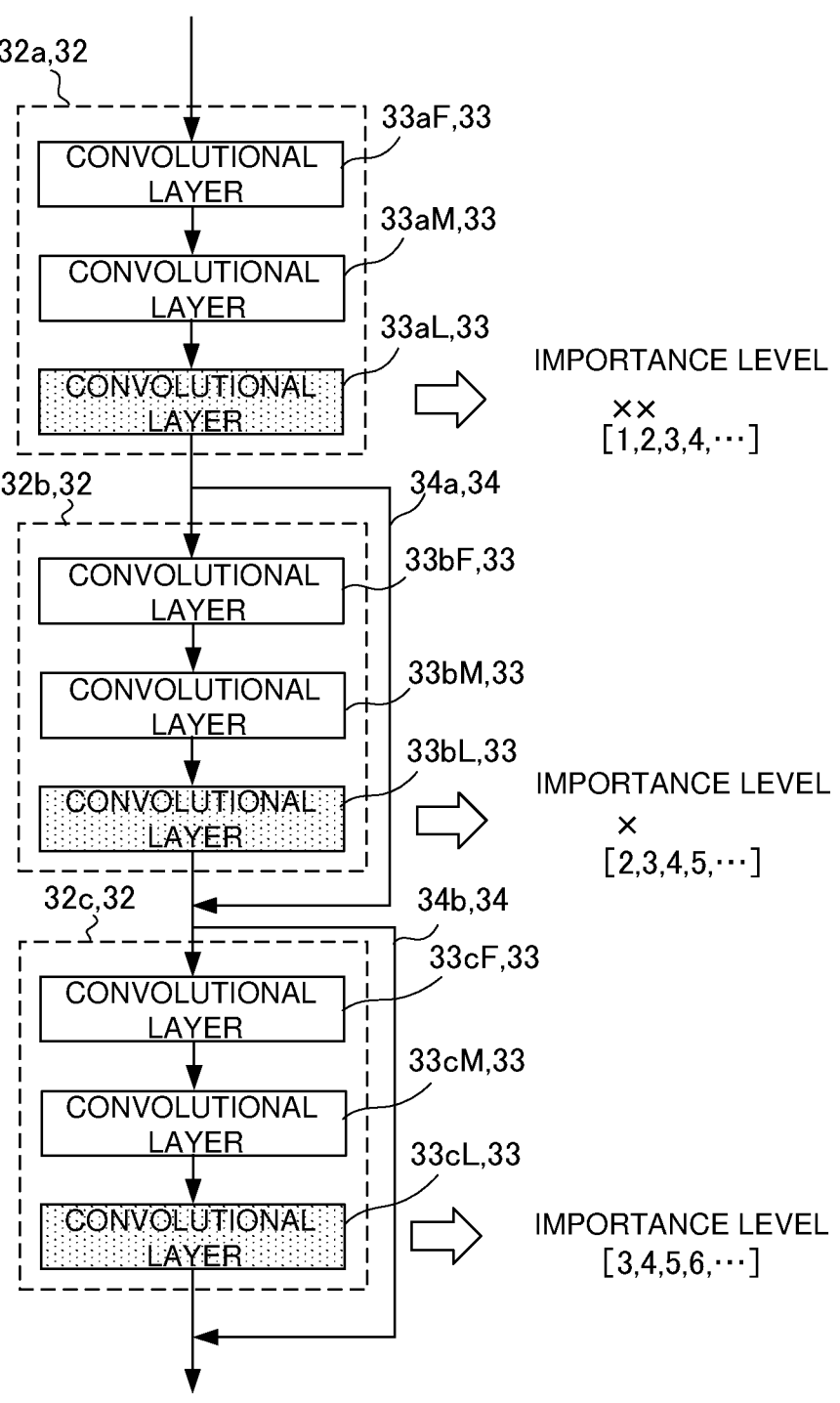
FIG. 13 is a diagram in illustration of the effect of a method according to the second embodiment.

For the sake of discussion, consider a configuration where, also with second layers, as with first layers, not importance levels determined through grouping but importance levels determined for each layer 33 are used. Also in this example, it is assumed that a channel with an importance level of two or less is determined as an unnecessary channel. In this case, with the last convolutional layer 33aL, which is a second layer, the first and second channels are determined as unnecessary channels; with the last convolutional layer 33bL, which is a second layer, the first channel is determined as an unnecessary channel; and with the last convolutional layer 33cL, which is a second layer, no channel is determined as an unnecessary channel. That is, with the configuration shown in FIG. 13, pruning produces a difference in the number of channels among layers 33 that are linked together by residual connections 34. This makes it impossible to perform processing using residual connections 34, which is inconvenient. Such inconvenience can be avoided with the configuration according to this embodiment.

Referring back to FIG. 10, on completion of the determination of unnecessary channels in the neural network 30, an advance is made to the subsequent step, S25A.

Figure 14:
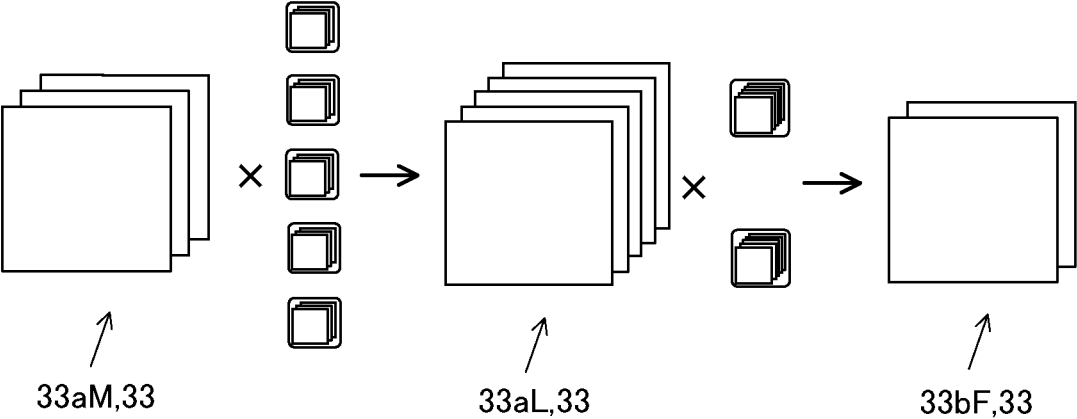
FIG. 14 is a diagram in illustration of pruning performed in units of channels.
Figure 15:
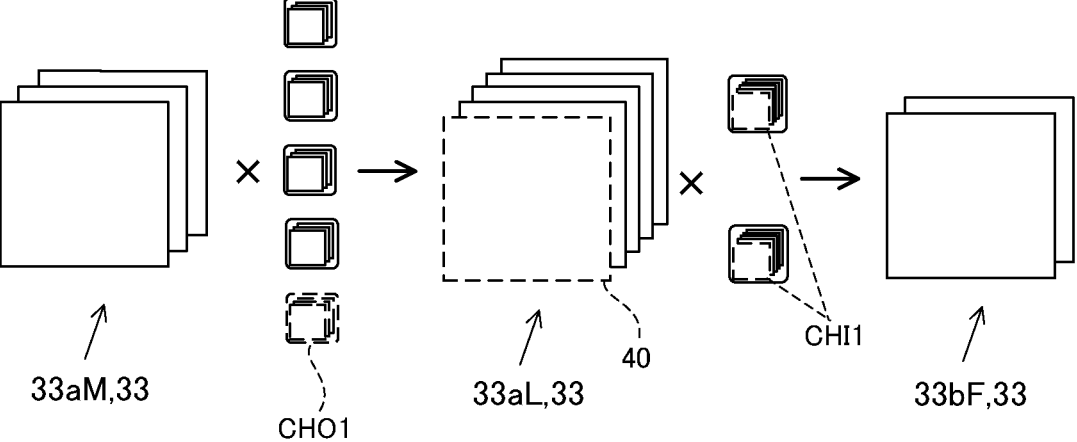
FIG. 15 is a diagram in illustration of pruning performed in units of channels.

At step S25A, the processing section 11 performs pruning taking as the target those channels which have been determined as unnecessary channels in the neural network 30. FIGS. 14 and 15 are diagrams in illustration of pruning performed in units of channels. FIG. 14 shows a state before pruning, and FIG. 15 shows a state after pruning. The example shown in FIGS. 14 and 15 assumes a case where filter pruning (see FIG. 6) as mentioned earlier is performed.

Specifically, FIGS. 14 and 15 show the pruning that is performed with the last convolutional layer 33aL in the first block 32a shown in FIGS. 11 and 12. As described with reference to FIG. 12, in the convolutional layer 33aL, the first channel is taken as the target of pruning. Accordingly, as indicated by broken lines in FIG. 15, pruning deletes the feature map 40 of the first channel in the convolutional layer 33aL. Pruning also deletes the first output channel CHO1 in the group of convolutional filters that is used in convolution computation for the convolutional layer 33aM immediately preceding the convolutional layer 33aL. Pruning also deletes the first input channel CHI1 in the group of convolutional filters that is used in convolution computation to obtain the convolutional layer 33bF succeeding the convolutional layer 33aL.

On completion of the pruning, similar to that shown in FIG. 15, with all the channels taken as the target of pruning, the pruning shown in FIG. 10 ends for now. On completion of the pruning shown in FIG. 10, then, in a preferred embodiment, as mentioned above, re-training (step S3 in FIG. 7) is performed. That is, the processing section 11 trains the pruned neural network. With this configuration, it is possible to optimize weight parameters in a pruned neural network, and to suppress a drop in the processing accuracy of the pruned neural network.

Notes

The various technical features disclosed herein may be implemented in any manners other than in the embodiments described above, and allow for many modifications without departure from the spirit of their technical ingenuity. That is, the embodiments described above should be understood to be in every aspect illustrative and not restrictive, and the technical scope of the present invention is defined not by the description of the embodiments given above but by the appended claims and encompasses any modifications within a scope and sense equivalent to those claims. As necessary, any two or more of the embodiments and modified examples may be implemented in combination unless infeasible.

What is claimed is:

1. A method of creating a learning model in which pruning is performed on a neural network, the method executed by a controller and comprising:

the controller performing a first pruning process in which pruning is performed on the neural network in units of channels of convolutional layers; and the controller performing a second pruning process in which pruning is performed on the neural network in units of weight parameters, the method further comprising the controller classifying convolutional layers of the neural network that are linked together by residual connections into a same group and calculating an importance level of the group so that all of the convolutional layers of the group have an identical importance level, and the controller deciding, according to the importance level that has been calculated, whether to perform the first pruning process in units of channels in the convolutional layers classified into the group.

2. The method according to claim 1, wherein further comprising:

the controller performing training using a data set after the first pruning process, the controller performing the second pruning process after the training, and the controller performing training using a data set after the second pruning process.

3. The method according to claim 2, wherein the controller performs the first pruning process and the training after the first pruning process continuously a plurality of times.

4. The method according to claim 3, wherein the controller performs the second pruning process and the training after the second pruning process continuously a plurality of times.

5. A method of pruning a neural network, the method executed by a controller and comprising:

the controller performing a first pruning process in which pruning is performed on the neural network in units of channels of convolutional layers; and the controller performing a second pruning process in which pruning is performed on the neural network in units of weight parameters, the method further comprising the controller classifying convolutional layers of the neural network that are linked together by residual connections into a same group and calculating an importance level of the group so that all of the convolutional layers of the group have an identical importance level, and the controller deciding, according to the importance level that has been calculated, whether to perform the first pruning process in units of channels in the convolutional layers classified into the group.

6. A method of machine learning in which pruning is performed on a neural network, the method executed by a controller and comprising:

the controller classifying convolutional layers of the neural network that are linked together by residual connections into a same group and calculating an importance level of the group so that all of the convolutional layers of the group have an identical importance level, and the controller deciding, according to the importance level that has been calculated, whether to perform the pruning in units of channels in the convolutional layers classified into the group.

7. The method according to claim 6, further comprising:

before the classifying, the controller calculating the importance level for each of the convolutional layers that are to be classified into the group, wherein the calculating the importance level of the group includes calculating an average importance level by averaging the calculated importance levels of the convolutional layers classified into the group, and the deciding whether to perform the pruning in units of channels in the convolutional layers classified into the group is based on the average importance level calculated for the group.

8. The method according to claim 6, further comprising:
the controller calculating, for a each individual convolutional layer of the neural network that is not classified into the group, the importance level of the individual convolutional layer individually, and
the controller deciding, according to the calculated importance level, whether to perform the pruning in units of channels in the individual convolutional layer.

9. The method according to claim 6, further comprising:
the controller taking as a target of the pruning a predetermined proportion of the convolutional layers in increasing order of the calculated importance levels, and
for the convolutional layers grouped into the group, the controller using a number of convolutional layers grouped into the group to calculate the predetermined proportion.

* * * * *